United States Patent
Kong et al.

(10) Patent No.: US 8,255,111 B2
(45) Date of Patent: Aug. 28, 2012

(54) GRAVITY SENSOR CIRCUIT SYSTEM FOR VEHICLE

(75) Inventors: Seung Ki Kong, Gyeonggi-do (KR); Chun Gen Lim, Daegu (KR); Jeong Min Shim, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 502 days.

(21) Appl. No.: 12/627,563

(22) Filed: Nov. 30, 2009

(65) Prior Publication Data

US 2011/0054733 A1   Mar. 3, 2011

(30) Foreign Application Priority Data

Aug. 28, 2009 (KR) .................. 10-2009-0080774

(51) Int. Cl.
*G01M 17/00* (2006.01)
(52) U.S. Cl. .......... 701/29.2; 701/29.7; 701/30.5; 701/82; 361/238
(58) Field of Classification Search .......... 701/29.2, 701/29.7, 30.5, 82, 71, 38, 90, 30.9, 30.8; 180/197; 361/238
See application file for complete search history.

(56) References Cited

U.S. PATENT DOCUMENTS

| 7,480,547 B2 * | 1/2009 | Brown et al. | 701/1 |
| 7,590,481 B2 * | 9/2009 | Lu et al. | 701/70 |
| 7,885,750 B2 * | 2/2011 | Lu | 701/90 |

FOREIGN PATENT DOCUMENTS

| JP | 2000-308209 | 11/2000 |
| JP | 2003-182404 | 7/2003 |
| KR | 10-2005-0019246 | 3/2005 |
| KR | 10-0783904 | 12/2007 |

* cited by examiner

*Primary Examiner* — Gertrude Arthur Jeanglaude
(74) *Attorney, Agent, or Firm* — Edwards Wildman Palmer LLP; Peter F. Corless

(57) ABSTRACT

A gravity sensor (G-sensor) circuit system including a microcontroller that determines whether there is a failure in the G-sensor and, if it is determined that there is a failure in the G-sensor, outputs a failure signal to a controller outside the PCB, or the controller outside the PCB communicates with the G-sensor to determine whether there is a failure in the G-sensor, thus performing the self-diagnosis. The gravity sensor (G-sensor) circuit system performs self-diagnosis, zero-offset, and digital output, thereby using a more accurate sensor signal, improving the vehicle stability, and increasing the control precision and accuracy.

13 Claims, 4 Drawing Sheets

GRAVITY SENSOR CIRCUIT SYSTEM FOR VEHICLE

CROSS-REFERENCE TO RELATED APPLICATION

This application claims under 35 U.S.C. §119(a) the benefit of Korean Patent Application No. 10-2009-0080774 filed Aug. 28, 2009, the entire contents of which are incorporated herein by reference.

BACKGROUND (a) Technical Field

The present disclosure relates to a gravity sensor (G-sensor) circuit system for a vehicle. More particularly, it relates to a circuit system including a G-sensor used in a vehicle for the measurement of a yaw rate, an acceleration rate, and a road inclination angle, and for the detection of a collision.

(b) Background Art

Generally, a vehicle includes an engine to generate power, a power transmission system to drive the vehicle by converting the power generated by the engine into a rotational force of a wheel, a steering system to change traveling direction of the vehicle, a suspension system to improve ride comfort and steering stability by absorbing an impact applied from a road surface, and a brake system to reduce the speed of the vehicle or stop the vehicle.

The operations of these elements are controlled by various electrical and electronic control units to improve the driving performance, stability, ride comfort and convenience.

As an example, a gravity sensor (G-sensor) mounted on front and rear wheels of the vehicle and generating a signal by detecting the vehicle position is provided in an electronic control unit of the vehicle.

In general, the zero point of the G-sensor is set under the assumption that the vehicle is in a horizontal position and then is changed by the traveling state of the vehicle or the state of the road surface, which results in a change in the measurement value of the G-sensor.

The G-sensor is widely used in a variety of vehicles, which are commercially available or under development at present, such as hybrid vehicles and fuel cell vehicles as well as internal combustion engine vehicles. Although the application of G-sensors varies depending on G-sensitivity, unidirectional/bidirectional type, and the like, the G-sensors are used in a variety of electronic control systems of the vehicle such as an anti-lock braking system (ABS), an electronic stability program (ESP), an electronic control suspension (ECS), an airbag system, and an anti-rolling control system to detect the vehicle's position, an inclination angle, and a collision.

In the above-described application, signals output from the G-sensors are used as an input signal and a reference signal for performing an electronic control logic for the measurement of a yaw rate (using left and right G values), an acceleration rate, an inclination angle (using front and rear G values), and an impact strength, and for the detection of a collision.

In more detail, when the vehicle is restarted after being stopped on a slope ("idle stop & go" in an HEV/"stop & go" in a general vehicle), the anti-rolling control system controls the brake system by determining the inclination angle with reference to a signal of the G-sensor during the stop of the vehicle, thus preventing the vehicle from rolling backwards. Moreover, the signals of the G-sensor are used as a collision signal for inflating an airbag in the airbag system, as a reference signal for turning off a main relay of a high-voltage battery during collision of the hybrid vehicle to prevent an electric shock, and as a signal for calculating a target yaw moment as a safety assessment criterion to be compared with a target yaw rate.

As such, the G-sensor is a very important sensor used in a variety of systems in the vehicle for a variety of purposes, and when a failure or malfunction occurs in the G-sensor or when the measurement value contains an error, it would be fatal to the safety of the vehicle and passengers.

However, the conventional G-sensor has no self-diagnosis function and cannot thus determine whether there is a failure in itself. Moreover, during the initial installation of the G-sensor, during the initial installation of a controller which communicates with the G-sensor for the control operation, or during the update of the controller software, the G-sensor itself cannot offset the zero point (e.g., inclination angle zero-offset). As a result, when the G-sensor with an incorrect zero point is used, it is impossible to output an accurate signal and accurately control the vehicle. Furthermore, since the conventional G-sensor outputs an analog signal which is disadvantageous in terms of noise, it is necessary to improve the accuracy.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a gravity sensor circuit system for a vehicle, comprising: a gravity sensor including a status output terminal, a signal input terminal, and a signal output terminal through which a sensor measurement signal is output; and a microcontroller connected to the status output terminal and the signal input terminal of the gravity sensor to communicate with the gravity sensor. The microcontroller applies a diagnosis signal to the signal input terminal of the gravity sensor and, when a status signal is input from the status output terminal of the gravity sensor, determines whether there is a failure in the gravity sensor based on the status signal.

Preferably, the microcontroller may apply a voltage signal having a predetermined voltage or a pulse voltage signal as the diagnosis signal to the signal input terminal of the gravity sensor and compare a voltage signal input from the status output terminal of the gravity sensor as the status signal with the voltage signal applied as the diagnosis signal to determine whether there is a failure in the gravity sensor. In this case, the microcontroller may determine that the gravity sensor is in a normal state, if the status signal coincides with the diagnosis signal within a predetermined error range and determine that the gravity sensor is in a failure state, if the status signal is out of the error range.

Preferably, the microcontroller may output a failure signal to a controller if it is determined that the gravity sensor is in a failure state.

Preferably, the microcontroller may be connected to the signal output terminal of the gravity sensor to set a measurement signal currently output from the signal output terminal of the gravity sensor as a zero point, when an electrical signal is received from the outside or when an offset command is received from a controller mounted in the vehicle, and to offset the sensor measurement signal of the gravity sensor based on a deviation between the set zero point and an intrinsic zero point of the gravity sensor. In this case, the currently output measurement signal and the sensor measurement signal may be measured with respect to an inclination angle of a road.

In another aspect, the present invention provides a gravity sensor circuit system for a vehicle, comprising a gravity sensor including a status output terminal, a signal input terminal, and a signal output terminal through which a sensor measurement signal is output, the status output terminal and the signal input terminal of the gravity sensor being connected to a controller mounted in the vehicle. The controller applies a diagnosis signal to the signal input terminal of the gravity sensor and, when a status signal is input from the status output terminal of the gravity sensor, determines whether there is a failure in the gravity sensor based on the status signal.

In this case, preferably, the controller may apply a voltage signal having a predetermined voltage or a pulse voltage signal as the diagnosis signal to the signal input terminal of the gravity sensor and compare a voltage signal input from the status output terminal of the gravity sensor as the status signal with the voltage signal applied as the diagnosis signal to determine whether there is a failure in the gravity sensor. The controller may compare the voltage signal input as the status signal with the voltage signal applied as the diagnosis signal, and determine that the gravity sensor is in a normal state if the status signal coincides with the diagnosis signal within a predetermined error range and determine that the gravity sensor is in a failure state if the status signal is out of the error range.

Suitably, the gravity sensor circuit system may further comprise an analog-to-digital converter for converting an analog voltage measurement signal output from the signal output terminal of the gravity sensor into a digital signal and outputting the digital signal to the controller. The analog-to-digital converter may be a comparator for comparing an analog voltage measurement signal with a reference value and converting the analog voltage measurement signal into a digital signal.

The above and other aspects and features of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
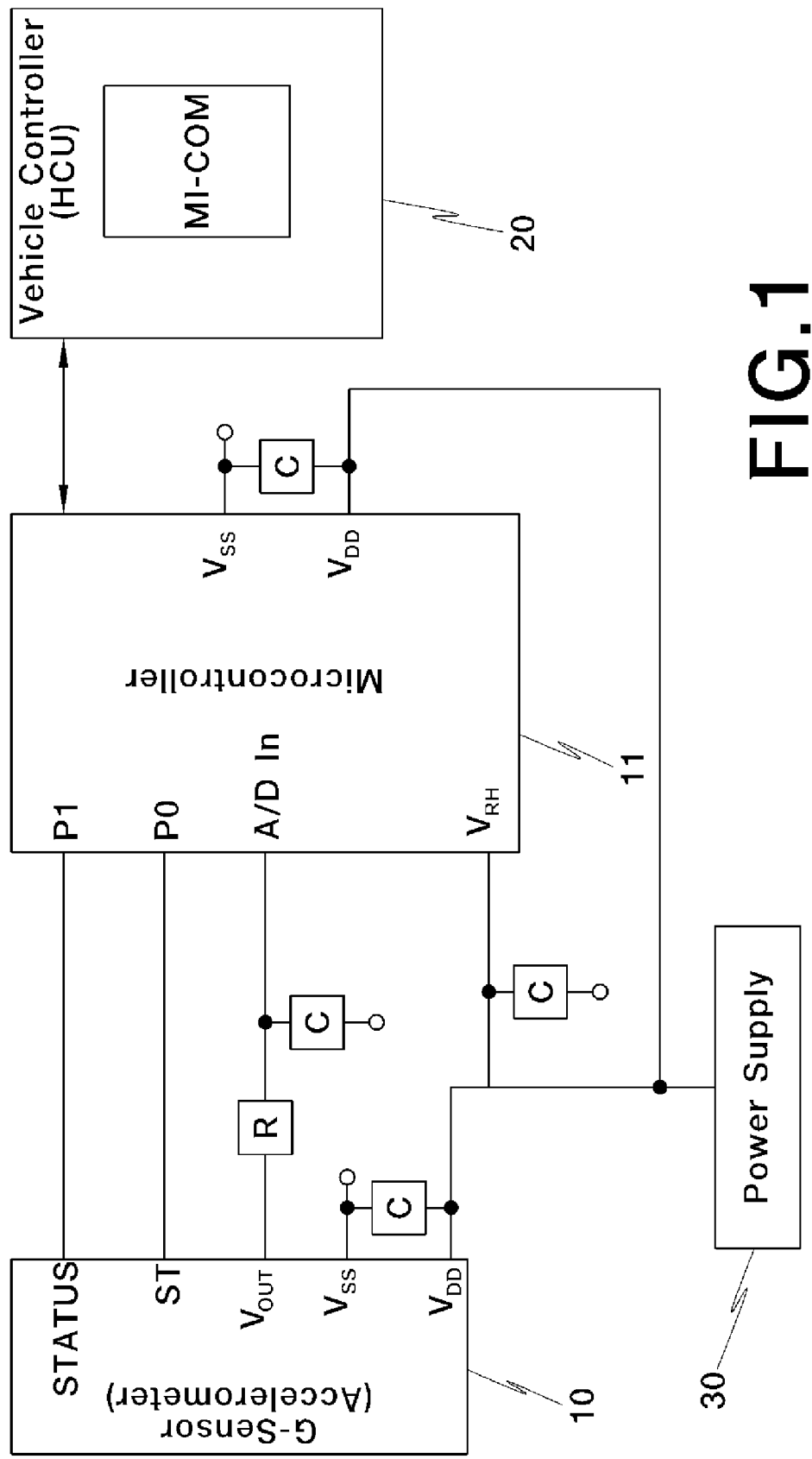
FIG. 1 is a schematic circuit diagram for the self-diagnosis of a G-sensor circuit system for a vehicle in accordance with a preferred embodiment of the present invention.

Reference numerals set forth in the Drawings includes reference to the following elements as further discussed below:

| 10: G-sensor | 11: microcontroller |
|---|---|
| 12: comparator | 20: controller |
| 30: power supply | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a circuit system including a G-sensor used in a vehicle for the measurement of a yaw rate, an acceleration rate, and a road inclination angle, and for the detection of a collision. Particularly, the present invention provides a G-sensor circuit system for a vehicle, which is configured to perform the functions of self-diagnosis, zero-offset, and digital output.

First, a configuration for implementing the self-diagnosis will be described below. In the present invention, a microcontroller mounted on a printed circuit board (PCB) on which a G-sensor chip is mounted determines whether there is a failure in the G-sensor and, if a failure is determined, outputs a failure signal to a controller outside the PCB, otherwise, the controller outside the PCB communicates with the G-sensor to determine whether there is a failure in the G-sensor, thus performing the self-diagnosis.

FIG. 1 is a schematic circuit diagram for the self-diagnosis of a G-sensor circuit system for a vehicle in accordance with a preferred embodiment of the present invention, in which a G-sensor (chip) 10 and a microcontroller 11 communicatably connected to the G-sensor (chip) 10 are mounted on a printed circuit board to provide a rapid diagnosis.

The microcontroller 11 and the G-sensor 10 operate by receiving electric power from a power supply 30, and a status output terminal STATUS and a signal input terminal ST of the G-sensor 10 are connected to terminals of the microcontroller 11.

In this state, when a driver turns an ignition key (IG KEY) to ON position, the microcontroller 11 applies a diagnosis signal, i.e., a predetermined voltage signal, to the signal input terminal ST of the G-sensor 10 in an initial diagnosis mode.

In this case, the microcontroller 11 applies a predetermined voltage (e.g., 5 V) or a pulse voltage to the signal input terminal ST of the G-sensor 10.

Figure 2:
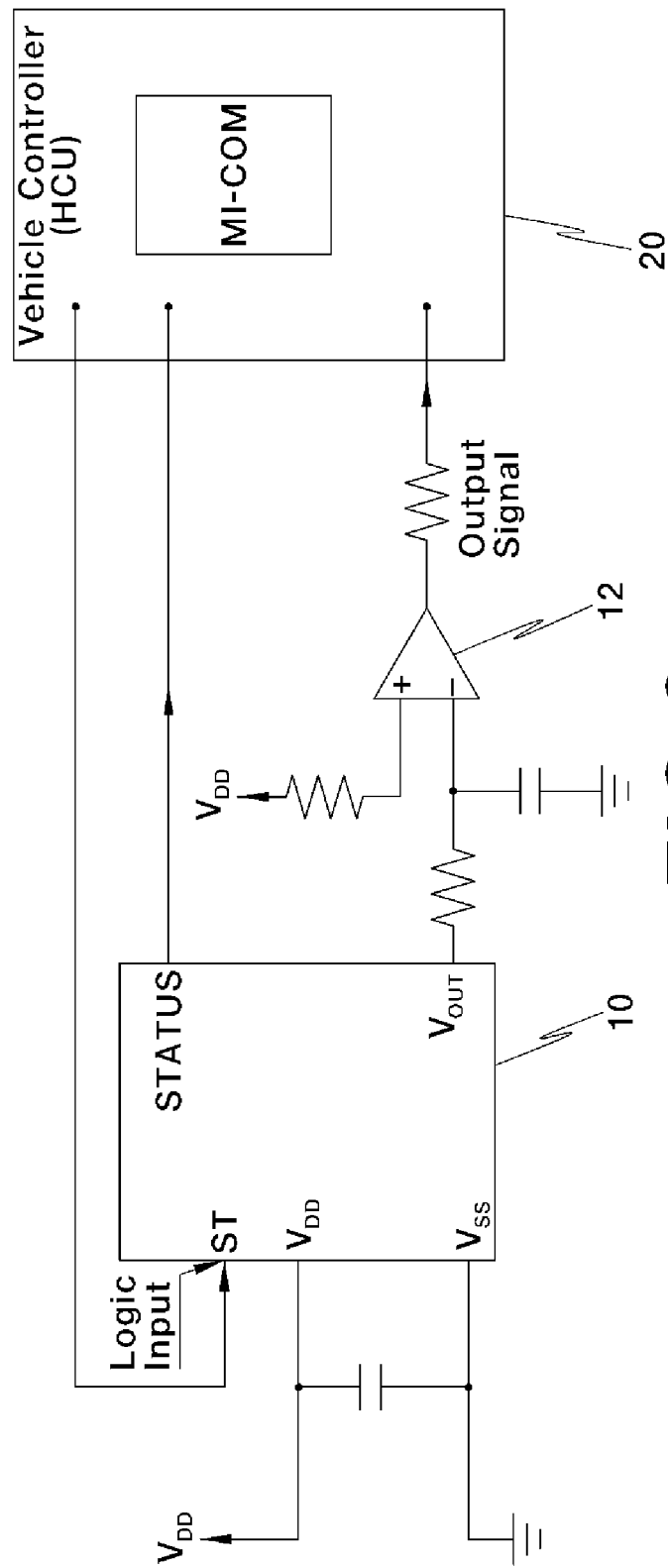
FIG. 2 is a diagram showing an example in which a microcontroller applies a pulse voltage as a diagnosis signal to a signal input terminal of a G-sensor in accordance with a preferred embodiment of the present invention.

FIG. 2 is a diagram showing an example in which the microcontroller applies a pulse voltage as a diagnosis signal to the signal input terminal of the G-sensor in accordance with a preferred embodiment of the present invention.

When the voltage signal is applied to the signal input terminal ST of the G-sensor 10 in the above-described manner, a status signal indicating whether there is a failure is output from the status output terminal STATUS of the G-sensor 10, and the microcontroller 11 receives the status signal to determine whether there is a failure in the G-sensor 10.

In this process, a voltage signal which coincides with the voltage signal input to the signal input terminal ST within a predetermined error range is output from the status output terminal STATUS during the normal operation of the G-sensor 10, and thus the microcontroller 11 determines that there is no failure in the G-sensor 10 based on the voltage signal, i.e., the status signal, output from the status output terminal STATUS of the G-sensor 10.

If there is a failure in the G-sensor 10, a low voltage which is out of the error range is output from the status output terminal STATUS of the G-sensor 10, and the microcontroller 11 receives the voltage signal to determine that there is a failure in the G-sensor 10.

If it is determined that there is a failure in the G-sensor 10, the microcontroller 11 outputs a failure signal to an external controller 20, and thus the controller 20 recognizes the failure of the G-sensor 10 to control the vehicle in a predetermined control mode or indicate the sensor failure through a warning means.

As an operation example, if the microcontroller 11 applies a voltage of 5 V when the ignition key is in the ON position, a voltage of 5 V is output from the status output terminal STATUS of the G-sensor 10, and the microcontroller 11 receives the voltage and determines that the G-sensor 10 is in a normal state.

On the contrary, when a voltage of less than 5 V is input from the status output terminal STATUS of the G-sensor 10, the microcontroller 11 determines that the G-sensor 10 is in a failure state and outputs a failure signal to the controller 20.

In the case where the microcontroller 11 applies a pulse voltage to the signal input terminal ST of the G-sensor 10, the microcontroller 11 applies a high signal (5 V) and, when a voltage of 5 V is received from the status output terminal STATUS of the G-sensor 10, determines that the G-sensor 10 is in a normal state. On the contrary, when a voltage which is out of the error range is received, the microcontroller 11 determines that the G-sensor 10 is in a failure state.

The controller 20 may be a hybrid control unit (HCU) mounted in a hybrid vehicle or a controller such as an engine ECU and an airbag ECU mounted in an internal combustion engine vehicle.

Figure 3:
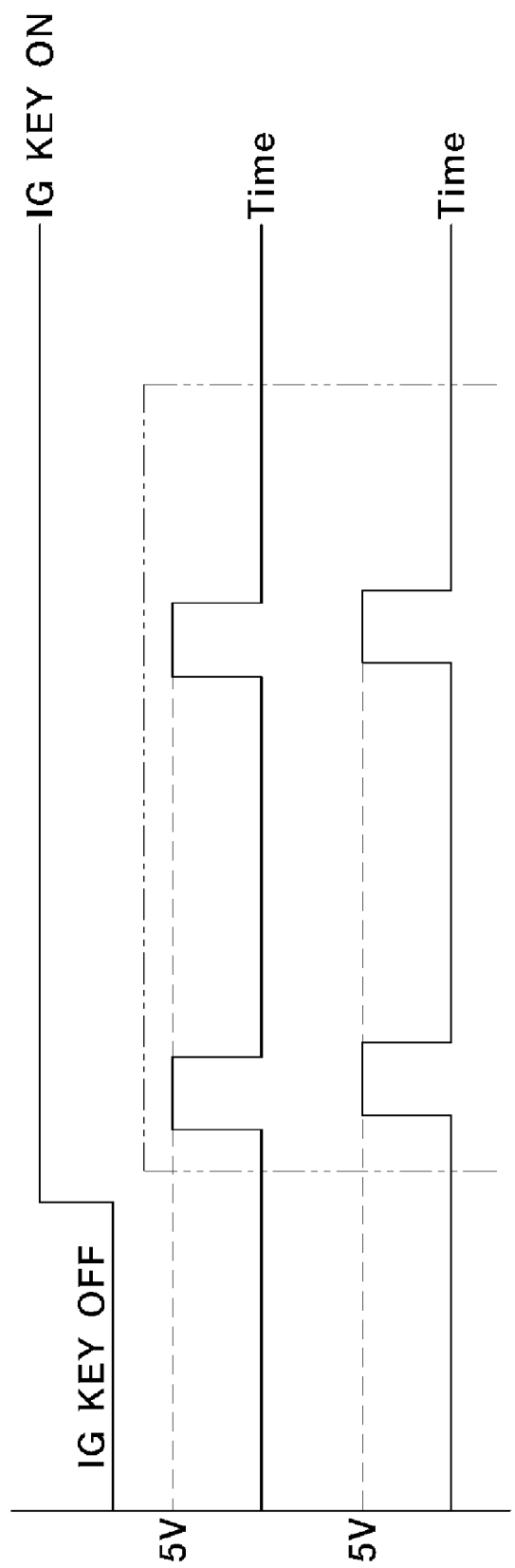
FIG. 3 is a schematic circuit diagram for the self-diagnosis of a G-sensor circuit system for a vehicle in accordance with another preferred embodiment of the present invention.

FIG. 3 is a schematic circuit diagram for the self-diagnosis of a G-sensor circuit system for a vehicle in accordance with another preferred embodiment of the present invention, in which the G-sensor 10 performs the self-diagnosis in association with a controller (e.g., HCU) outside the PCB.

In this embodiment, a separate microcontroller is not mounted on the PCB, but the status output terminal STATUS and the signal input terminal ST of the G-sensor 10 are connected to terminals of a controller 20 outside the PCB.

The self-diagnosis process of the G-sensor is performed in the same manner as the case in which the microcontroller is used.

That is, when the driver turns the ignition key (IG KEY) to the ON position, the controller 20 applies a diagnosis signal, i.e., a predetermined voltage signal, to the signal input terminal ST of the G-sensor 10 in an initial diagnosis mode. In this case, the controller 20 applies a predetermined voltage (e.g., 5 V) or a pulse voltage to the signal input terminal ST of the G-sensor 10.

When the voltage signal is applied to the signal input terminal ST of the G-sensor 10 in the above-described manner, a status signal indicating whether there is a failure is output from the status output terminal STATUS of the G-sensor 10, and the controller 20 receives the status signal to determine whether there is a failure in the G-sensor 10.

In this process, a voltage signal which coincides with the voltage signal input to the signal input terminal ST within a predetermined error range is output from the status output terminal STATUS during the normal operation of the G-sensor 10, and thus the controller 20 determines that there is no failure in the G-sensor 10.

If there is a failure in the G-sensor 10, a low voltage which is out of the error range is output from the status output terminal STATUS of the G-sensor 10, and the controller 20 receives the voltage signal to determine that there is a failure in the G-sensor 10.

If it is determined that there is a failure in the G-sensor 10, the controller 20 controls the vehicle in a predetermined control mode or indicate the sensor failure through a warning means.

Moreover, the status output terminal STATUS of the G-sensor 10 may indicate an EPROM parity error and, in order to clear the parity error, the microcontroller 11 or the controller 20 applies a high signal for a predetermined short period of time to the signal input terminal ST to be turned off (a low signal state).

Next, a configuration for implementing the zero-offset will be described.

In the G-sensor circuit system of the present invention, the microcontroller mounted on the PCB performs the zero-offset or the controller mounted in the vehicle performs the zero-offset in communication with the G-sensor.

The zero-offset of the sensor may be performed before the vehicle is shipped from a factory, during the initial installation of the G-sensor or the controller (e.g., HCU) which communicates with the G-sensor, during the replacement of the G-sensor or the controller, or during the update of the controller software.

Referring to FIG. 1, a signal output terminal Vout of the G-sensor 10, from which a sensor measurement signal is output, is connected to a terminal of the microcontroller 11 mounted on the PCB.

In this configuration, the zero point of the G-sensor 10 is offset by the microcontroller 11 and output.

That is, when an electrical signal is received from the outside or when an offset command is received from the controller 20 mounted in the vehicle, the microcontroller 11 sets the measurement signal currently output from the signal output terminal Vout of the G-sensor 10 as a zero point and offsets the sensor measurement signal of the G-sensor 10 based on a deviation between the set zero point and an intrinsic zero point of the G-sensor 10.

The reason that the zero-offset of the G-sensor is required is that an accurate zero point (e.g., 2.5 V) has not been able to be set due to the tolerance between the sensor chip itself, an outer housing, and a mounting bracket.

Therefore, the controller offsets the zero point deviation of the G-sensor before the vehicle or the sensor is shipped from the factory.

The zero-offset process will now be described by way of an example of a G-sensor for measuring an inclination angle. The zero-off should be performed on a flat road and, in this state, the microcontroller 11 receives an offset command from the controller 20 (e.g., HCU) mounted in the vehicle.

In this case, the controller 20 receives an electrical signal from the outside or an operation signal input from an operation device provided in the vehicle and applies the offset command to the microcontroller 11.

When the offset command is received in the above-described manner, the microcontroller 11 reads a voltage value output from the signal output terminal Vout of the G-sensor 10 to calculate a deviation between the intrinsic zero point voltage, i.e., the voltage value at an inclination angle of 0°, and the currently measured voltage and stores the deviation as an offset value.

That is, when the zero-offset is performed on a flat road, the microcontroller 11 sets the voltage value output from the signal output terminal Vout of the G-sensor 10 as the zero point.

Upon completion of the zero-offset, the microcontroller 11 outputs an offset measurement signal by reflecting the offset value on the sensor measurement signal output from the G-sensor 10, and the offset value is input to the controller (e.g., HCU or a controller related to an electronic control unit) and used as the G-sensor signal during electronic control.

As an example of the zero-offset, when a voltage of 2.8 V, not 2.5 V, is output from the signal output terminal Vout of the G-sensor 10 at an inclination angle of 0° during the zero-offset, the microcontroller 11 sets the voltage of 2.8 V as the zero point and offsets the output signal of the G-sensor 10 by the offset value of 0.3 V such that the G-sensor 10 outputs the voltage of 2.8 V as the zero point at an inclination angle of 0° thereafter (Programming Calibration).

In the configuration in which the controller 20 (e.g., HCU) performs the zero-offset in communication with the G-sensor 10, a separate microcontroller is not mounted on the PCB, but the controller 20 offsets the zero point of the G-sensor 10 in a state where the signal output terminal Vout of the G-sensor 10 is connected to a terminal of the controller 20 mounted in the vehicle.

The zero-offset process of the G-sensor is performed in the same manner as the case in which the microcontroller is used.

However, since the separate microcontroller is not mounted on the PCB, the controller 20 performs the zero-offset when an electrical signal is received from the outside or when an operation signal input from an operation device provided in the vehicle is received.

That is, when an electrical signal is received from the outside or when a predetermined operation of the vehicle is detected, the controller 20 sets the measurement signal currently output from the signal output terminal Vout of the G-sensor 10 as a zero point and offsets the sensor measurement signal of the G-sensor 10 based on a deviation between the set zero point and an intrinsic zero point of the G-sensor 10.

As such, the zero-offset process performed by the controller is the same as that performed by the microcontroller.

An example in which a hybrid vehicle is operated to perform the zero-offset will be described below.

First, before the zero-offset, the vehicle is placed on a flat road, the ignition key is turned to the ON position, the gear is in neutral position (N), the engine is turned off, the full auto temperature controller (FATC) is turned off, the electronic loads are turned off, and then the ignition key is turned to OFF position for, e.g., 2 seconds.

Then, in order to perform the zero-offset, the blower speed of the FATC is increased to the maximum and the air conditioner switch is turned on in a state where the accelerator pedal is fully depressed. At this time, it is necessary to simultaneously operate the blower speed and the air conditioner switch and then check whether an auto stop lamp is on.

Subsequently, the state in which the auto stop lamp is on is maintained for about, e.g., 5 seconds, and then the ignition key is turned to the OFF position for. e.g., 2 seconds.

As a result, the controller detects the operation of the vehicle for the zero-offset and thus the zero-offset of the G-sensor is performed by the microcontroller or the controller.

Meanwhile, the G-sensor circuit system of the present invention can output a digital signal by improving the conventional analog signal process.

Figure 4:
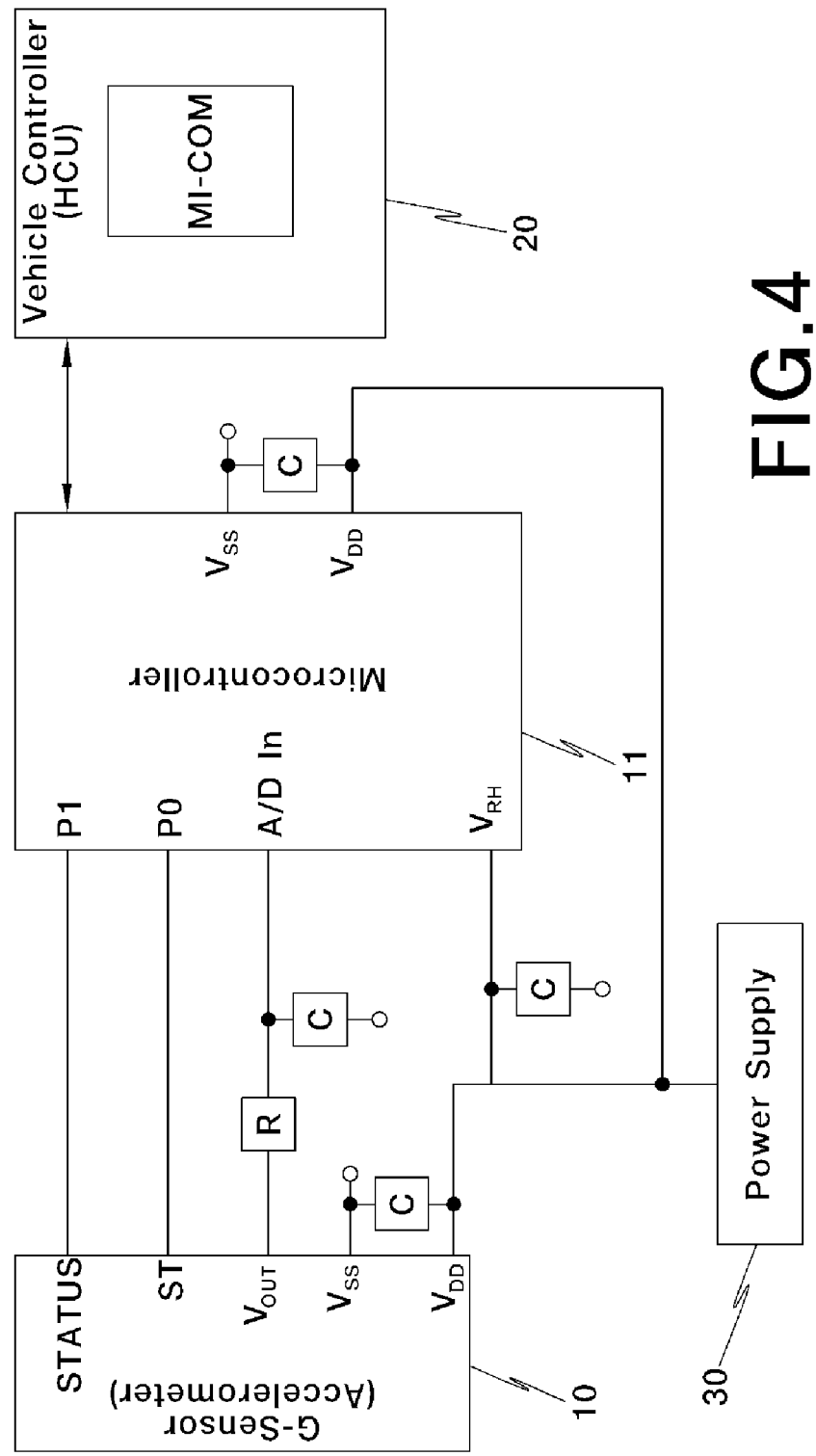
FIG. 4 is a schematic circuit diagram for the self-diagnosis of a G-sensor circuit system for a vehicle in accordance with still another preferred embodiment of the present invention.

FIG. 4 is a schematic circuit diagram of a G-sensor circuit system for a vehicle in accordance with still another preferred embodiment of the present invention, in which an analog-to-digital converter (A/D converter) 12 for converting an analog signal output from the G-sensor 10 into a digital signal is provided on the PCB on which the G-sensor 10 is mounted.

The above-described G-sensor circuit system may be usefully applied to configure a collision detection sensor. Since the collision detection sensor outputs a collision signal when a collision at more than a certain angle or a collision exceeding a predetermined impact occurs, it is possible to configure the collision detection sensor to output a digital signal such as a high/low signal (or an ON/OFF signal) instead of the conventional analog signal.

Since the intrinsic output of the G-sensor 10 is an analog signal which is susceptible to noise, the A/D converter 12 may be used to output a digital signal instead of a voltage signal (analog signal) when a collision at more than a certain angle or a collision exceeding a predetermined impact occurs, thus improving the accuracy.

Referring to FIG. 4, a comparator 12 may be used as the A/D converter, which compares an analog voltage measurement signal output from the signal output terminal Vout of the G-sensor 10 with a reference value to output a high (or ON) signal if the analog voltage measurement signal is more than the reference value and a low (or OFF) signal if it is less than the reference value.

In this case, when a collision at more than a certain angle or a collision exceeding a predetermined impact occurs, the voltage signal output from the G-sensor 10 is converted into a high signal and output to the controller. As such, when the conventional analog voltage measurement signal is converted into a digital signal such as a high/low signal (or an ON/OFF signal) and output to the controller, the vehicle controller (e.g., HCU) or the airbag ECU utilizes the digital signal as a collision signal.

As described above, the G-sensor circuit system for a vehicle of the present invention is configured to perform the function of self-diagnosis, zero-offset, and digital output, thereby using a more accurate sensor signal, improving the vehicle stability, and increasing the control precision and accuracy.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A gravity sensor circuit system for a vehicle, comprising:
a gravity sensor including a status output terminal, a signal input terminal, and a signal output terminal through which a sensor measurement signal is output; and
a microcontroller connected to the status output terminal and the signal input terminal of the gravity sensor to communicate with the gravity sensor,
wherein the microcontroller applies a diagnosis signal to the signal input terminal of the gravity sensor and, when a status signal is input from the status output terminal of the gravity sensor, determines whether there is a failure in the gravity sensor based on the status signal.

2. The gravity sensor circuit system of claim 1, wherein the microcontroller applies a voltage signal having a predetermined voltage or a pulse voltage signal as the diagnosis signal to the signal input terminal of the gravity sensor and compares a voltage signal input from the status output terminal of the gravity sensor as the status signal with the voltage signal applied as the diagnosis signal to determine whether there is a failure in the gravity sensor.

3. The gravity sensor circuit system of claim 2, wherein the microcontroller determines that the gravity sensor is in a normal state, if the status signal coincides with the diagnosis signal within a predetermined error range, and determines that the gravity sensor is in a failure state, if the status signal is out of the error range.

4. The gravity sensor circuit system of claim 1, wherein the microcontroller outputs a failure signal to a controller if it is determined that the gravity sensor is in a failure state.

5. The gravity sensor circuit system of claim 1, wherein the microcontroller is connected to the signal output terminal of the gravity sensor to set a measurement signal currently output from the signal output terminal of the gravity sensor as a zero point, when an electrical signal is received from the outside or when an offset command is received from a controller mounted in the vehicle, and to offset the sensor measurement signal of the gravity sensor based on a deviation between the set zero point and an intrinsic zero point of the gravity sensor.

6. The gravity sensor circuit system of claim 5, wherein the currently output measurement signal and the sensor measurement signal are measured with respect to an inclination angle of a road.

7. A gravity sensor circuit system for a vehicle, comprising a gravity sensor including a status output terminal, a signal input terminal, and a signal output terminal through which a sensor measurement signal is output, the status output terminal and the signal input terminal of the gravity sensor being connected to a controller mounted in the vehicle,
wherein the controller applies a diagnosis signal to the signal input terminal of the gravity sensor and, when a status signal is input from the status output terminal of the gravity sensor, determines whether there is a failure in the gravity sensor based on the status signal.

8. The gravity sensor circuit system of claim 7, wherein the controller applies a voltage signal having a predetermined voltage or a pulse voltage signal as the diagnosis signal to the signal input terminal of the gravity sensor and compares a voltage signal input from the status output terminal of the gravity sensor as the status signal with the voltage signal applied as the diagnosis signal to determine whether there is a failure in the gravity sensor.

9. The gravity sensor circuit system of claim 8, wherein the controller compares the voltage signal input as the status signal with the voltage signal applied as the diagnosis signal, and determines that the gravity sensor is in a normal state if the status signal coincides with the diagnosis signal within a predetermined error range and determines that the gravity sensor is in a failure state if the status signal is out of the error range.

10. The gravity sensor circuit system of claim 7, wherein the controller is connected to the signal output terminal of the gravity sensor to set a measurement signal currently output from the signal output terminal of the gravity sensor as a zero point, when an electrical signal is received from the outside or when a predetermined operation of the vehicle is detected, and to offset the sensor measurement signal of the gravity sensor based on a deviation between the set zero point and an intrinsic zero point of the gravity sensor.

11. The gravity sensor circuit system of claim 10, wherein the measurement signal and the sensor measurement signal are measured with respect to an inclination angle of a road.

12. The gravity sensor circuit system of claim 7, further comprising an analog-to-digital converter for converting an analog voltage measurement signal output from the signal output terminal of the gravity sensor into a digital signal and outputting the digital signal to the controller.

13. The gravity sensor circuit system of claim 12, wherein the analog-to-digital converter is a comparator for comparing an analog voltage measurement signal with a reference value and converting the analog voltage measurement signal into a digital signal.

* * * * *